(12) United States Patent
Fattal

(10) Patent No.: US 10,484,662 B2
(45) Date of Patent: Nov. 19, 2019

(54) MULTIVIEW CAMERA, MULTIVIEW IMAGING SYSTEM, AND METHOD OF MULTIVIEW IMAGE CAPTURE

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 45 days.

(21) Appl. No.: 15/742,519

(22) PCT Filed: Feb. 27, 2016

(86) PCT No.: PCT/US2016/019989
§ 371 (c)(1),
(2) Date: Jan. 7, 2018

(87) PCT Pub. No.: WO2016/138507
PCT Pub. Date: Sep. 1, 2016

(65) Prior Publication Data
US 2018/0205929 A1 Jul. 19, 2018

Related U.S. Application Data

(60) Provisional application No. 62/126,405, filed on Feb. 27, 2015.

(51) Int. Cl.
*H04N 13/128* (2018.01)
*H04N 5/247* (2006.01)
(Continued)

(52) U.S. Cl.
CPC ........... *H04N 13/128* (2018.05); *H04N 5/247* (2013.01); *H04N 13/106* (2018.05);
(Continued)

(58) Field of Classification Search
CPC .. H04N 13/128; H04N 13/351; H04N 13/106; H04N 13/296; H04N 13/282;
(Continued)

(56) References Cited

U.S. PATENT DOCUMENTS 6,522,325 B1 2/2003 Sorokin et al.
6,552,744 B2 * 4/2003 Chen .................. H04N 5/23293
348/218.1
(Continued)

FOREIGN PATENT DOCUMENTS

JP 2010225092 A 10/2010

OTHER PUBLICATIONS

International Search Report (ISR) of the International Searching Authority (ISA/KR) dated Jul. 21, 2016 (3 pages) for unterpart parent PCT patent application No. PCT/US2016/019989.
(Continued)

*Primary Examiner* — Gevell V Selby
(74) *Attorney, Agent, or Firm* — J. Michael Johnson

(57) ABSTRACT

A multiview camera and multiview imaging system provide a plurality of different cropped images corresponding to a virtual screen located in a scene. The multiview camera includes a plurality of cameras configured to capture different images of a scene that have an overlapping portion in common. The multiview camera further includes an image processor configured to provide cropped images from the captured images according to a cropping window defined within the overlapping portion. The cropping window corresponds to a virtual screen located within the scene. An arrangement of the cameras corresponds to an arrangement of views of a multiview display configured to display the cropped images. The multiview imaging system further includes the multiview display.

22 Claims, 10 Drawing Sheets

(51) Int. Cl.
*H04N 13/302* (2018.01)
*H04N 13/243* (2018.01)
*H04N 13/282* (2018.01)
*H04N 13/111* (2018.01)
*H04N 13/296* (2018.01)
*H04N 13/106* (2018.01)
*H04N 13/351* (2018.01)

(52) U.S. Cl.
CPC ......... *H04N 13/111* (2018.05); *H04N 13/243* (2018.05); *H04N 13/282* (2018.05); *H04N 13/296* (2018.05); *H04N 13/302* (2018.05); *H04N 13/351* (2018.05)

(58) Field of Classification Search
CPC .. H04N 13/243; H04N 13/302; H04N 13/111; H04N 5/247
See application file for complete search history.

(56) References Cited

U.S. PATENT DOCUMENTS

| | | | |
|---|---|---|---|
| 6,837,432 B2 | 1/2005 | Tsikos et al. | |
| 8,503,813 B2 | 8/2013 | Sun et al. | |
| 8,675,068 B2* | 3/2014 | Nixon | H04N 5/2258 348/144 |
| 8,754,941 B1 | 6/2014 | Sarwari et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,466,109 B1* | 10/2016 | Adsumilli | H04N 5/2625 |
| 9,557,466 B2 | 1/2017 | Fattal | |
| 9,785,119 B2 | 10/2017 | Taff et al. | |
| 2002/0145660 A1 | 10/2002 | Kanade et al. | |
| 2007/0014347 A1 | 1/2007 | Prechtl et al. | |
| 2014/0267243 A1 | 9/2014 | Venkataraman et al. | |
| 2014/0267633 A1 | 9/2014 | Venkataraman et al. | |
| 2015/0036068 A1* | 2/2015 | Fattal | G02B 6/0036 349/15 |
| 2015/0085131 A1* | 3/2015 | Anderson | H04N 7/181 348/157 |
| 2015/0279038 A1 | 10/2015 | MacMillan et al. | |

OTHER PUBLICATIONS

Hill Samuel L, Scalable Multi-view Stereo Camera Array for Real World Real-Time Image Capture and Three-Dimensional Displays, Thesis submitted to Program in Media Arts and Sciences, School of Architecture and Planning in partial fulfillment of requirements for the degree of Master of Science in Media Arts and Sciences at the Massachusetts Institute of Technology (MIT), Jun. 2004, 75 pages, copyright 2004 MIT.

Taguchi, Yuichi, et al., TransCAIP: A Live 3D TV System Using a Camera Array and an Integral Photography Display With Interactive Control of Viewing Parameters, IEEE Transactions on Visualuzation and Computer Graphics, Sep.-Oct. 2009, pp. 841-852, vol. 15, No. 5.

Zhang, Zhengyou, et al., Whiteboard Scanning and Image Enhancement, Microsoft Research Technical Report MSR-TR-2003-39, Jun. 2003, 25 pages, Microsoft Corporation, Redmond WA.

Jones, G., et al., Controlling Perceived Depth in Stereoscopic Images, Proceedings of SPIE, 2001, p. 42-53, vol. 4297.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

\* cited by examiner

US 10,484,662 B2

MULTIVIEW CAMERA, MULTIVIEW IMAGING SYSTEM, AND METHOD OF MULTIVIEW IMAGE CAPTURE

CROSS-REFERENCE TO RELATED APPLICATIONS

This application is a U. S. national stage patent application filed under 35 U.S.C. § 371 and claims the benefit of priority to PCT Patent Application No. PCT/US2016/019989, filed Feb. 27, 2016, which claims priority from U.S. Provisional Patent Application Ser. No. 62/126,405, filed Feb. 27, 2015, the entirety of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

Image capture and especially three-dimensional (3D) image capture typically involve substantial image processing of captured images to convert the captured images (e.g., typically two-dimensional images) into 3D images for display on a 3D display or a multiview display. The image processing may include, but is not limited to, depth estimation, image interpolation, image reconstruction, or other complicated processes that may produce significant time delay from the moment the images are captured to the moment those images are displayed.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide multiview imaging corresponding to a multiview display. In particular, according to various embodiments of the principles described herein, multiview imaging or multiview image capture of a scene may be provided by a multiview camera configured to produce a multiview image of the scene comprising a plurality of separate images captured or recorded from different angles or perspectives. Together the separate images embody a multiview image of the scene that may be viewed on the multiview display. Moreover, viewing the multiview image on the corresponding multiview display may enable a viewer to perceive elements within the multiview image of the scene at different apparent depths within the physical environment when viewed on the multiview display, for example. As such, the multiview camera or 'Holocam' may produce a multiview image that, when viewed on the corresponding multiview display, provides a viewer with a three-dimensional (3D) viewing experience, according to some embodiments.

According to various embodiments, the multiview camera comprises a plurality of cameras having an arrangement corresponding to an arrangement of views in the multiview display. The multiview display is used to display the multiview image captured by the multiview camera. According to some embodiments, camera mis-alignment and pointing inaccuracies, zero-disparity plane positioning and zoom level of the multiview image may be adjusted using image processing of the captured multiview image (e.g., as opposed to physical adjustment of the cameras or components thereof). Further, an adjustable baseline or spacing between cameras of the multiview camera may be used change a view disparity and thus provide an adjustable depth of field (DOF) or equivalently facilitate DOF enhancement and compression, according to some embodiments.

Figure 1A:
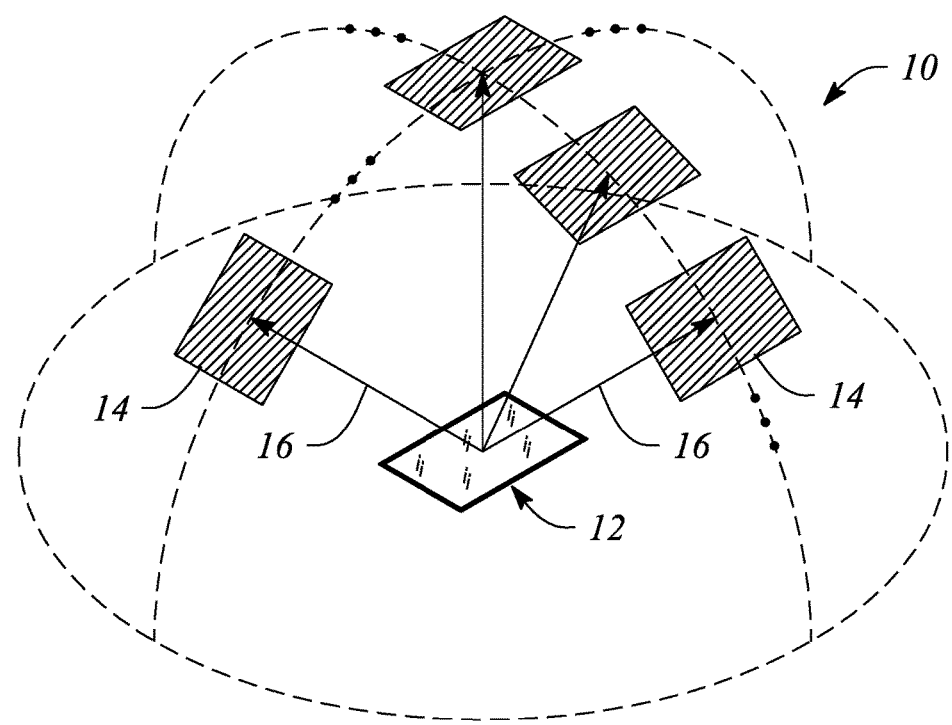
FIG. 1A illustrates a perspective view of a multiview display, according to an example consistent with the principles described herein.

According to various embodiments, the multiview display is an electronic display or display system configured to provide different views of the multiview image in different view directions. FIG. 1A illustrates a perspective view of a multiview display 10, according to an example consistent with the principles described herein. As illustrated, the multiview display 10 comprises a screen 12 that is viewed in order to see the multiview image. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows 16; and only four views 14 and view directions 16 are illustrated, all by way of example and not limitation. Note that while the different views 14 are illustrated in FIG. 1A as being above the screen, the views 14 actually appear on or in a vicinity of the screen 12 when a multiview image is displayed on the multiview display 10. Depicting the views 14 above the screen 12 is only for simplicity of illustration meant to represent viewing the multiview display 10 from a respective one of the view directions 16 corresponding to a particular view 14. Further, the views 14 and corresponding view directions 16 of the multiview display 10 are generally organized or arranged in a particular arrangement dictated by an implementation of the multiview display 10. For example, the views 14 and corresponding view directions 16 may have a rectangular arrangement, a square arrangement, circular arrangement, hexagonal arrangement, and so on, as dictated by a specific multiview display implementation, as further described below.

Figure 1B:
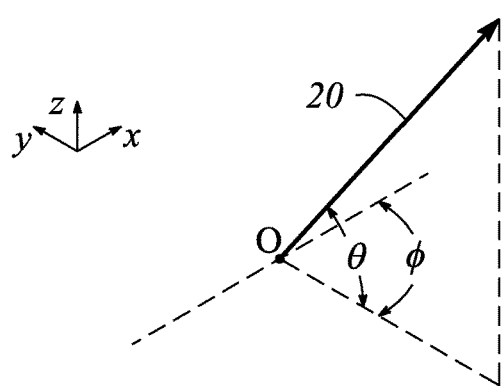
FIG. 1B illustrates a graphical representation of angular components of a light beam having a particular principal angular direction corresponding to a view direction of a multiview display, according to an example of the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\varphi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction of a multiview display, according to an example of the principles described herein. In addition, the light beam 20 is emitted or emanates from a particular point, by definition herein. That is, by definition, the light beam 20 has a central ray associated with a particular point of origin within the multiview display. FIG. 1 also illustrates the light beam (or view direction) point of origin O.

Herein, 'multiview' as used in the terms 'multiview image' and 'multiview display' is defined as a plurality of views representing different perspectives or including angular disparity between views of the plurality. Further, the term 'multiview' by definition explicitly includes more than two different views (i.e., a minimum of three views and generally more than three views). As such, 'multiview' as employed herein is explicitly distinguished from stereoscopic views that include only two different views to represent a scene, for example. Note however, while multiview images and multiview displays include more than two views, by definition herein, multiview images may be viewed (e.g., on a multiview display) as a stereoscopic pair of images by selecting only two of the views to view at a time (e.g., one view per eye).

According to various embodiments, multiview displays, also often referred to as autostereoscopic or 'glasses free' 3D electronic displays, may be realized according to a variety of different technologies and approaches. For example, multiview displays may be based on, but not limited to, lenticular arrays, parallax barriers, Fourier-plane shuttering, retro-reflective mirrors or half-silvered mirrors. In some embodiments, the multiview display may be a multibeam diffraction grating-based display comprising a multibeam diffractive grating-based backlight. The multibeam diffractive grating-based backlight employs multibeam diffractive coupling of light out from a light guide using a multibeam diffraction grating to produce light beams corresponding to the plurality of different views of the multibeam display. In particular, an array of multibeam diffraction gratings may be used to provide coupled-out light beams corresponding to pixels of different views of the displayed image (i.e., multiview image). According to various embodiments, the coupled-out light beams have different principal angular directions from one another (also referred to as 'differently directed' herein for simplicity of discussion only). Further, in some embodiments, these differently directed light beams produced by the multibeam diffraction grating may be modulated and serve as dynamic pixels (i.e., multiview pixels) corresponding to the different views of the displayed multiview image.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds the light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar.

In some embodiments, a plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, a 'diffraction grating' and more specifically a 'multibeam diffraction grating' is generally defined as a plurality of features (i.e., diffractive features) arranged to provide diffraction of light incident on the diffraction grating. In some examples, the plurality of features may be arranged in a periodic or quasi-periodic manner. For example, the plurality of features (e.g., a plurality of grooves in a material surface) of the diffraction grating may be arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating. Moreover, the different principal angular directions may correspond to the different view directions 16 illustrated in FIG. 1A, for example.

According to various embodiments, characteristics of the multibeam diffraction grating and features (i.e., diffractive features) thereof, may be used to control one or both of the angular directionality of the light beams and a wavelength or color selectivity of the multibeam diffraction grating with respect to one or more of the light beams. The characteristics that may be used to control the angular directionality and wavelength selectivity include, but are not limited to, one or more of a grating length, a grating pitch (feature spacing), a shape of the features, a size of the features (e.g., groove width or ridge width), and an orientation of the grating. In some examples, the various characteristics used for control may be characteristics that are local to a vicinity of the point of origin of a light beam.

Herein a 'collimator' is defined as substantially any optical device or apparatus that is configured to collimate light. For example, a collimator may include, but is not limited to, a collimating mirror or reflector, a collimating lens, or various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'light source' is defined as a source of light (e.g., an apparatus or device that emits light). For example, the light source may be a light emitting diode (LED) that emits light when activated. The light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light. Moreover, a 'plurality of light sources of different colors' is explicitly defined herein as a set or group of light sources in which at least one of the light sources produces light having a color, or equivalently a wavelength, that differs from a color or wavelength of light produced by at least one other light source of the light source plurality. Moreover, the 'plurality of light sources of different colors' may include more than one light source of the same or substantially similar color as long as at least two light sources of the plurality of light sources are different color light sources (i.e., at least two light sources produce colors of light that are different). Hence, by definition herein, a 'plurality of light sources of different colors' may include a first light source that produces a first color of light and a second light source that produces a second color of light, where the second color differs from the first color.

Herein, an 'arrangement' or a 'pattern' is defined as relationship between elements defined by a relative location of the elements and a number of the elements. More specifically, as used herein, an 'arrangement' or a 'pattern' does not define a spacing between elements or a size of a side of an array of elements. As defined herein, a 'square' arrangement is a rectilinear arrangement of elements that includes an equal number of elements (e.g., cameras, views, etc.) in each of two substantially orthogonal directions (e.g., an x-direction and a y-direction). On the other hand, a 'rectangular' arrangement is defined as a rectilinear arrangement that includes a different number of elements in each of two orthogonal directions.

Herein, a 'multiview image' is defined as a plurality of images (i.e., greater than three images) wherein each image of the plurality represents a different view corresponding to a different view direction of the multiview image. As such, the multiview image is a collection of images (e.g., two-dimensional images) which, when display on a multiview display, may facilitate a perception of depth and thus appear to be an image of a 3D scene to a viewer, for example.

Embodiments consistent with the principles described herein may be implemented using a variety of devices and circuits including, but not limited to, one or more of integrated circuits (ICs), very large scale integrated (VLSI) circuits, application specific integrated circuits (ASIC), field programmable gate arrays (FPGAs), digital signal processors (DSPs), graphical processor unit (GPU), and the like, firmware, software (such as a program module or a set of instructions), and a combination of two or more of the above. For example, an image processor or other elements described below may all be implemented as circuit elements within an ASIC or a VLSI circuit. Implementations that employ an ASIC or a VLSI circuit are examples of hardware-based circuit implementations.

In another example, an embodiment of the image processor may be implemented as software using a computer programming language (e.g., C/C++) that is executed in an operating environment or a software-based modeling environment (e.g., MATLAB®, MathWorks, Inc., Natick, Mass.) that is executed by a computer (e.g., stored in memory and executed by a processor or a graphics processor of a computer). Note that one or more computer programs or software may constitute a computer-program mechanism, and the programming language may be compiled or interpreted, e.g., configurable or configured (which may be used interchangeably in this discussion), to be executed by a processor or a graphics processor of a computer.

In yet another example, a block, a module or an element of an apparatus, device or system (e.g., image processor, camera, etc.) described herein may be implemented using actual or physical circuitry (e.g., as an IC or an ASIC), while another block, module or element may be implemented in software or firmware. In particular, according to the definitions above, some embodiments described herein may be implemented using a substantially hardware-based circuit approach or device (e.g., ICs, VLSI, ASIC, FPGA, DSP, firmware, etc.), while other embodiments may also be implemented as software or firmware using a computer processor or a graphics processor to execute the software, or as a combination of software or firmware and hardware-based circuitry, for example.

Further, as used herein, the article 'a' is intended to have its ordinary meaning in the patent arts, namely 'one or more'. For example, 'a camera' means one or more cameras and as such, 'the camera' means 'the camera(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2:
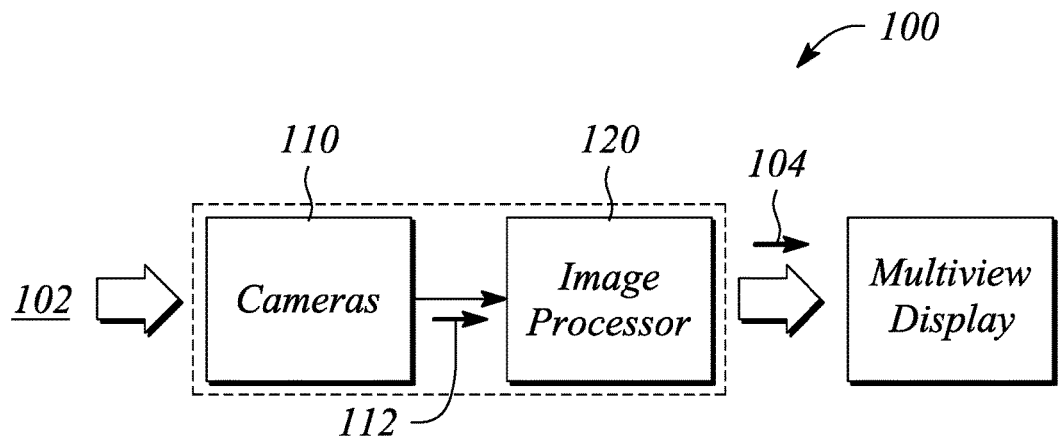
FIG. 2 illustrates a block diagram of a multiview camera in an example, according to an embodiment consistent with the principles described herein.

According to some embodiments of the principles described herein, a multiview camera is provided. FIG. 2 illustrates a block diagram of a multiview camera 100 in an example, according to an embodiment consistent with the principles described herein, illustrated with a multiview display. The multiview camera 100 is configured to capture an image of a scene 102. In particular, the multiview camera 100 may be configured to capture a plurality of images representing different views of the scene 102, wherein the different views represent a multiview image 104. Moreover, the multiview camera 100 is configured to provide or produce multiview images 104 suitable to be displayed on the multiview display (e.g., the multiview display 10 illustrated in FIG. 1A), according to various embodiments.

As illustrated in FIG. 2, the multiview camera 100 comprises a plurality of cameras 110. According to various embodiments, the plurality of cameras 110 comprises more than two (i.e., three or more) cameras 110. A camera 110 of the plurality is configured to capture an image 112 of the scene 102 that is different from images of the scene captured by other cameras 110 of the plurality. For example, each camera 110 may capture a different image 112 of the scene. Moreover, the different captured images 112 may represent different perspective views of the scene 102, for example. Further, the captured image 112 from a camera 110 of the plurality comprises an overlapping portion of the scene 102 in common with the captured images from the other cameras 110 of the plurality. In particular, each of the captured images 112 includes a portion of the scene 102 in common with all other captured images 112. As such, a field of view (FOV) of each of the cameras 110 of the plurality at least partially overlaps an FOV of the other cameras 110, according to various embodiments.

Herein, a portion of a captured image 112 that includes a portion of a scene in common with other captured images 112 is referred to as an 'overlapping portion' of the image or equivalently an 'overlapping image portion.' Overlapping portions of the captured images 112 of a scene generally capture or record similar objects or other aspects of the scene, albeit from different perspectives.

Figure 3A:
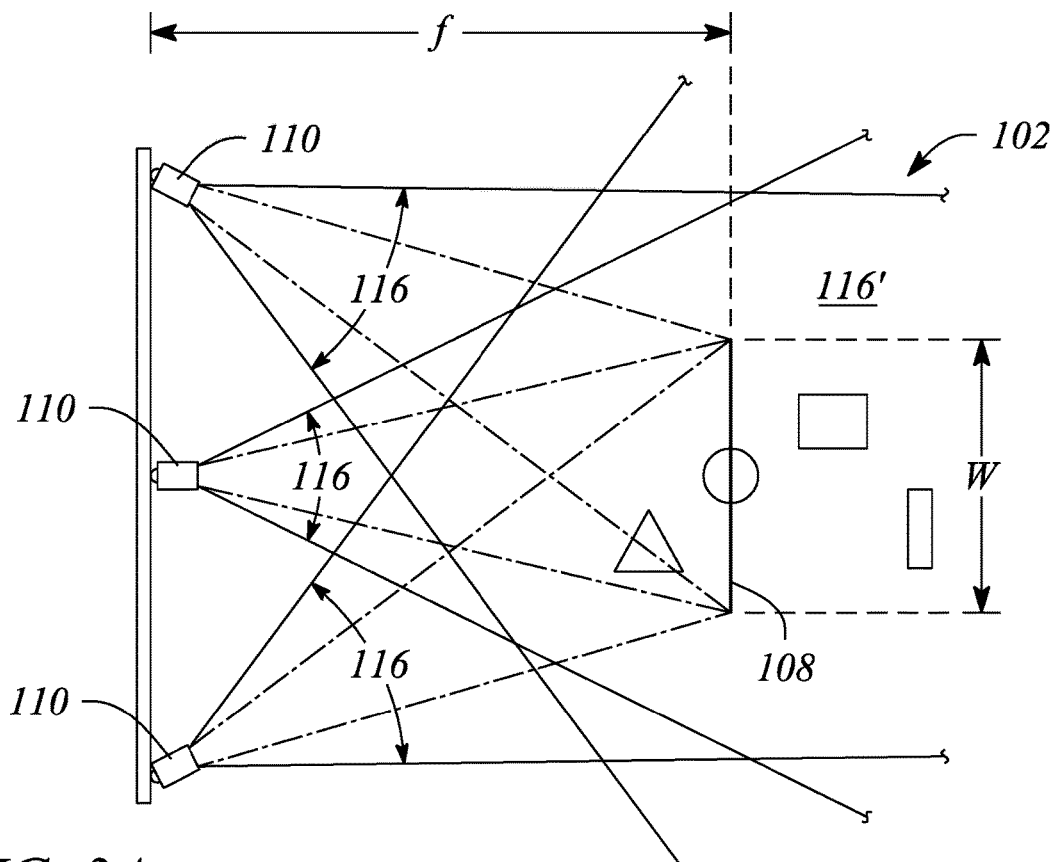
FIG. 3A illustrates a side view of a plurality of cameras in an example, according to an embodiment consistent with the principles described herein.
Figure 3B:
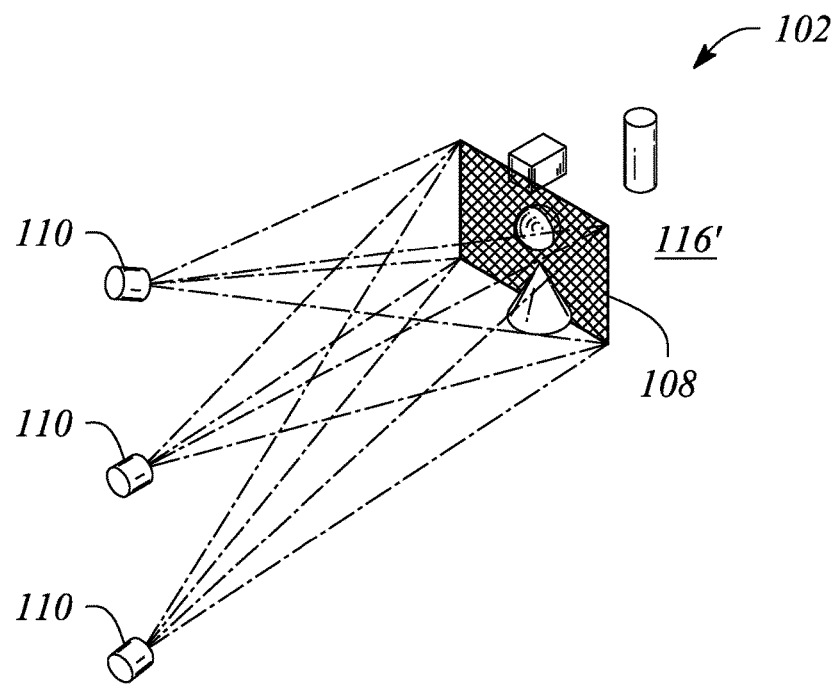
FIG. 3B illustrates a perspective view of the plurality of cameras illustrated in FIG. 3A in an example, according to an embodiment consistent with the principles described herein.

FIG. 3A illustrates a side view of a plurality of cameras 110 in an example, according to an embodiment consistent with the principles described herein. FIG. 3B illustrates a perspective view of the plurality of cameras 110 illustrated in FIG. 3A in an example, according to an embodiment consistent with the principles described herein. In particular, FIGS. 3A-3B illustrate three cameras 110 configured to capture images of a scene 102 that includes several objects (e.g., a cone, a block, a ball and a cylinder, as illustrated). Further illustrated in FIG. 3A are FOVs 116 associated with each camera 110. Solid diverging lines delineate individual FOVs 116 associated with each of the cameras 110, as illustrated. Further as illustrated, the various FOVs 116 overlap with each other in a portion of the scene 102, i.e., an overlapping FOV portion 116'. Moreover, located within the overlapping FOV portion 116' is a virtual screen 108, as further described below with respect to the image processor 120 in FIG. 2. Note that only three cameras 110 are illustrated in FIGS. 3A-3B by way of example and not limitation. Also, the FOVs 116 are omitted in FIG. 3B for clarity of illustration.

Figure 3C:
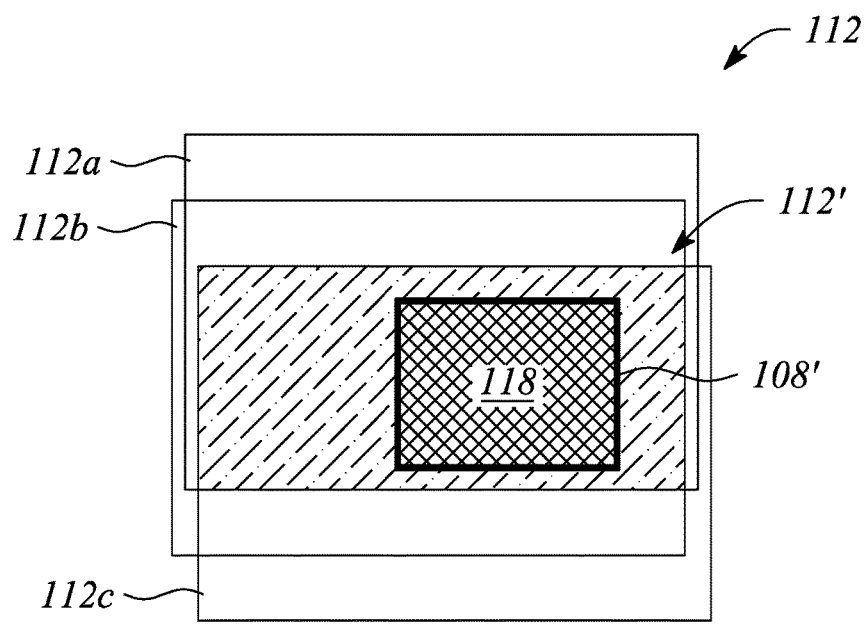
FIG. 3C illustrates a plurality of captured images in an example, according to an embodiment consistent with the principles described herein.

FIG. 3C illustrates a plurality of captured images 112 in an example, according to an embodiment consistent with the principles described herein. In particular, FIG. 3C illustrates three (3) different captured images 112a, 112b, 112c representing example images captured by three (3) different cameras 110 of the plurality of cameras 110 (e.g., the cameras illustrated in FIGS. 3A and 3B), by way of example. As illustrated in FIG. 3C, the three captured images 112 overlap one another in an overlapping image portion 112' (i.e., dash-dot hatched area), for example, corresponding to the overlapping portion 116' within the FOVs 116 of the three cameras 110 illustrated in FIGS. 3A-3B. Note that within the overlapping image portion 112', the images include in common the overlapping FOV portion 116', by definition. Moreover, different ones of the captured images 112 include a different perspective view of the portion of the scene 102 in the overlapping image portion 112'.

According to various embodiments, the cameras 110 of the plurality may comprise substantially any camera or related imaging or image capture device. In particular, the cameras 110 may be digital cameras configured to capture digital images. For example, a digital camera may include digital image sensor such as, but not limited to, a charge-coupled device (CCD) image sensor, a complimentary metal-oxide semiconductor (CMOS) image sensor, or a back-side-illuminated CMOS (BSI-CMOS) sensor. Further, the cameras 110 may be configured to capture one or both of still images (e.g., photographs) and moving images (e.g., video), according to various embodiments.

According to various embodiments, the cameras 110 of the plurality may be arranged on, in or otherwise associated with a surface (not illustrated). The surface may be substantially any two-dimensional, topological manifold. For example, the surface may include, but is not limited to, a planar surface, a spherical surface, or a cylindrical surface. Further, the cameras 110 are spaced apart on the surface, according to various embodiments. A spacing between cameras 110 on the surface is referred to as a 'baseline,' by definition herein. The baseline (or spacing) between the cameras 110 of the plurality on the surface is configured to provide each camera 110 with a different perspective view of a scene to be imaged by the cameras 110.

Figure 4A:
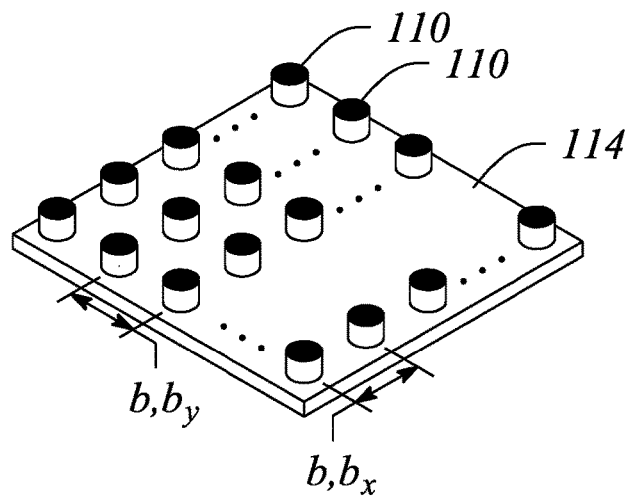
FIG. 4A illustrates a perspective view of a plurality of cameras on a surface in an example, according to an embodiment consistent with the principles described herein.
Figure 4B:
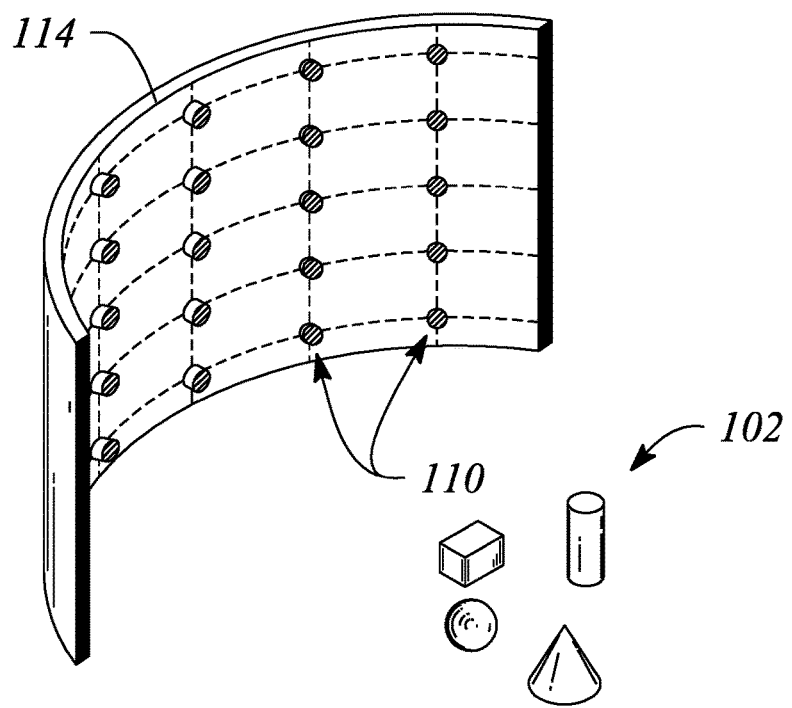
FIG. 4B illustrates a perspective view of a plurality of cameras on a surface in an example, according to another embodiment consistent with the principles described herein.

FIG. 4A illustrates a plurality of cameras 110 on a surface 114 in an example, according to an embodiment consistent with the principles described herein. FIG. 4B illustrates a plurality of cameras 110 on a surface 114 in an example, according to another embodiment consistent with the principles described herein. In particular, the surface 114 illustrated in FIG. 4A is a planar surface, while the surface 114 illustrated in FIG. 4B is a cylindrical surface. Also illustrated in FIG. 4B is a scene 102 to be imaged by the cameras 110. According to various embodiments, the surface 114 may be either an actual or physical surface 114 or may represent or be a virtual surface 114. For example, a physical surface 114 may be a material surface to which or in which the cameras 110 are affixed. On the other hand, a virtual surface 114 may be provided or realized by a mounting structure or similar apparatus (i.e., as opposed to a physical mounting surface) configured to hold or provide a fixed relationship between the cameras 110 of the plurality. For example, the mounting structure may hold the cameras 110 in a predetermined physical relationship to one another to provide the virtual surface 114.

A baseline b is illustrated in FIG. 4A between a pair of cameras 110. In general, the baseline b may be between any two adjacent cameras 110. As such, there may be a directional baseline $b_x$ between cameras 110 in a first direction (e.g., an x-axis) and another directional baseline $b_y$ between cameras 110 in a second direction (e.g., a y-axis). FIG. 4A further illustrates the directional baselines $b_x$, $b_y$ between pairs of cameras 110. In some embodiments, the baselines b are substantially similar between all pairs of cameras 110. In other embodiments, the baselines b may be different for different camera pairs (e.g., directional baseline $b_x$ may differ from directional baseline $b_y$).

The plurality of cameras 110 may represent an array of cameras 110 or equivalently a camera array. For example, the array of cameras 110 may represent different patterns or arrangements on the surface 114 including, but not limited to, a square arrangement, a rectangular arrangement, a circular or radial arrangement, or a hexagonal arrangement on the surface 114. The arrangement of cameras 110 in FIG. 4B represents a rectangular arrangement. FIG. 4A may depict either a square arrangement or a rectangular arrangement depending a number of cameras 110 in each direction represented by the directional baselines $b_x$, $b_y$.

Figure 5A:
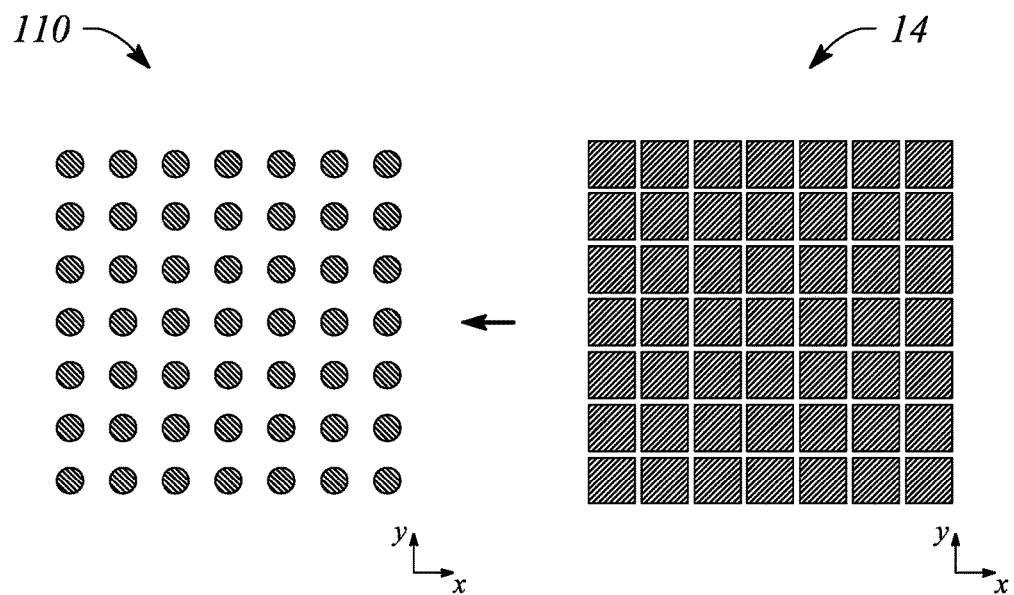
FIG. 5A illustrates a plan view of an array of cameras in an example, according to an embodiment consistent with the principles described herein.
Figure 5B:
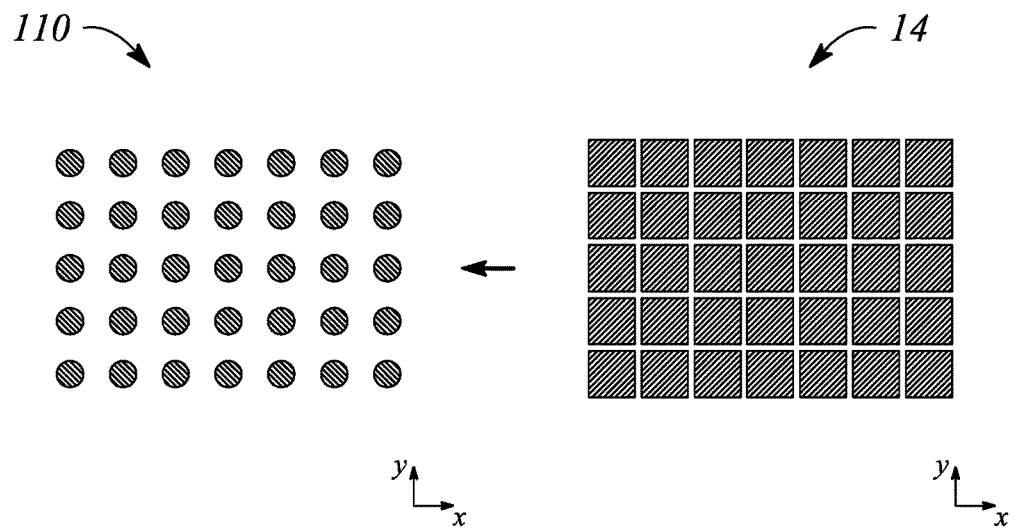
FIG. 5B illustrates a plan view of an array of cameras in an example, according to another embodiment consistent with the principles described herein.

FIG. 5A illustrates plan view of an array of cameras 110 in an example, according to an embodiment consistent with the principles described herein. FIG. 5B illustrates plan view of an array of cameras 110 in an example, according to another embodiment consistent with the principles described herein. In particular, a left side of FIG. 5A illustrates the array of cameras 110 arranged in a square arrangement, and a left side of FIG. 5B illustrates the array of cameras 110 arranged in a rectangular arrangement. Note that the arrangements in FIGS. 5A and 5B are both rectilinear arrangements, but that the square arrangement has an equal number of cameras in each of two orthogonal directions (e.g., the x-direction and the y-direction) and the rectangular arrangement includes a different number of cameras in the two orthogonal directions.

Figure 5C:
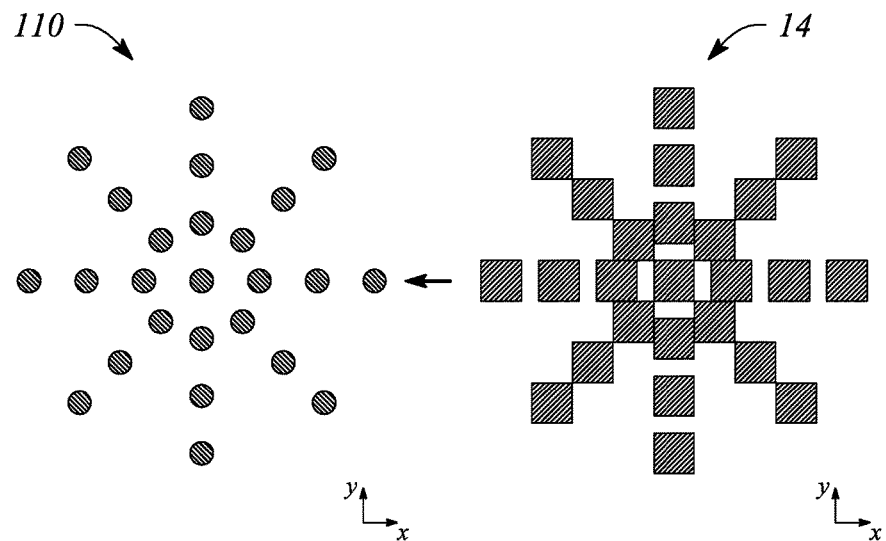
FIG. 5C illustrates a plan view of an array of cameras in an example, according to another embodiment consistent with the principles described herein.
Figure 5D:
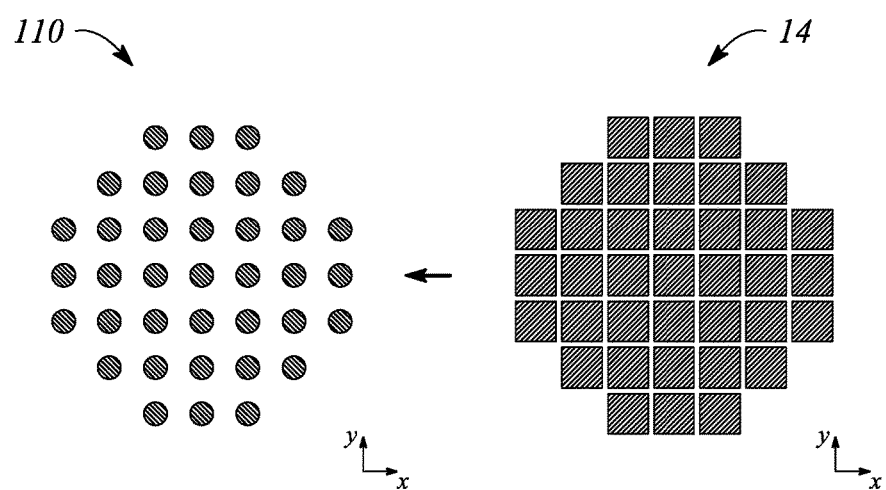
FIG. 5D illustrates a plan view of an array of cameras in an example, according to another embodiment consistent with the principles described herein.

FIG. 5C illustrates plan view of an array of cameras 110 in an example, according to another embodiment consistent with the principles described herein. FIG. 5D illustrates plan view of an array of cameras 110 in an example, according to another embodiment consistent with the principles described herein. In particular, a left side of FIG. 5C illustrates a circular or radial arrangement of the camera array and a left side of FIG. 5D illustrates a hexagonal arrangement of the camera array.

Referring again to FIG. 2, the multiview camera 100 further comprises an image processor 120. According to various embodiments, the image processor 120 is configured to provide a cropped image 118 from the captured images 112 according to a cropping window 108' defined within the overlapping image portion 112', e.g., illustrated in FIG. 3C. According to various embodiments, the cropping window 108' is a portion of and corresponds to a virtual screen 108 located within the overlapping FOV portion 116' of the scene 102, as illustrated in FIGS. 3A-3C. According to some embodiments, the image processor 120 may be configured to generate the cropping window 108' from the virtual screen 108. In other embodiments, the image processor 120 may receive the cropping window 108' from another source (e.g., the multiview display) and then provide the cropped image 118 according to the cropping window 108'.

Herein, a 'virtual screen' is defined as a location and region within a scene corresponding to the physical display screen of the multiview display (e.g., the screen 12 of the multiview display 10 of FIG. 1A). The virtual screen may represent a rectangular surface at a particular distance from the cameras 110 within the scene 102. Further, the virtual screen is located within the overlapping FOV portion 116' (i.e., an in-common portion of the camera FOVs 116) and represents a 'window' into the scene 102 corresponding to the multiview image 104 that is to be displayed on the multiview display. In other words, the virtual screen represents a window into the scene 102 as represented on the multiview display by the multiview image 104, according to various embodiments. Further, the virtual screen may correspond to a zero-disparity plane of the multiview display, according to various embodiments.

Referring again to FIG. 3A, the virtual screen 108 may be located within the cameras FOVs 116 at a distance f from the cameras 110 of the plurality. When the multiview display has a rectangular physical screen, the virtual screen 108 similarly has a rectangular shape. In the side view of FIG. 3A, only a side of the rectangular virtual screen 108 is visible and thus depicted. However, the virtual screen 108 illustrated in FIG. 3A is intended to represent a rectangular window positioned at the distance f from the cameras 110 within the overlapping FOV portion 116', as illustrated therein. Note that, as illustrated in FIG. 3A, the virtual screen 108 is depicted perpendicular to a plane of the drawing. However, in practice, the virtual screen 108 may have substantially any orientation within the overlapping FOV portion 116' that corresponds with the multiview image 104.

With further reference to FIGS. 3A-3C, the virtual screen 108 defines a cropping window 108' within the overlapping portions 112', 116' of the respective captured images 112 in the FOVs 116. Referring to FIG. 3C, the cropping window 108' defined by the virtual screen 108 is illustrated as a rectangular area within the overlapping image portion 112'. Cropped images 118 are portions of the captured images 112 within the cropping window 108'. In FIG. 3A, the cropping window 108' is delineated by the dash-dot lines within the respective FOVs 116 of cameras 110 (e.g., that within the overlapping FOV portion 116'). Similarly, the dash-dot lines delineating the cropping window 108' defined by the virtual screen 108 within the overlapping FOV portion 116' are also illustrated in FIG. 3B.

The image processor 120 may selectively control both the distance f and a size W of the virtual screen 108 or equivalently of the cropping window 108' when cropping the captured images 112 to produce the cropped images 118, according to various embodiments. Control of the distance f and the size W by the image processor 120 during image cropping may facilitate focusing on objects within the scene 102 as well as providing image zooming and panning (e.g., target tracking) with respect to the objects of the scene 102. In addition, a location of the virtual screen 108 within the scene 102 (e.g., as provided by the image processor 120) may provide control over a position of the zero-disparity plane, for example.

According to various embodiments, image processor 120 may comprise substantially any processor or similar apparatus configured to process images. For example, the image processor 120 may comprise a specialized processor such as, but not limited to, a graphics processor unit (GPU) or a GPU embedded in a central processing unit (CPU). The GPU may be implement as a purpose-designed integrated circuit (IC), an application specific integrated circuit (ASIC), a field programmable gate array (FPGA) or the like, for example. For example, the GPU may comprise a GeForce® GPU manufactured by NVIDIA Corporation of Santa Clara, Calif. In other examples, the image processor 120 may comprise software or firmware executed by a general-purpose processor (e.g., a general purpose computer) or another processor. In some embodiments, the image processor 120 may be a separate or stand alone element, module, or unit of the multiview camera 100. In other embodiments, the image processor 120 may be implemented by one of the multiview display or the plurality of cameras 110. For example, each of the cameras 110 may include a GPU configured to provide image processing or associated with the image processor 120. As such, collectively the cameras 110 of the plurality may also include the image processor 120 or portions thereof. In another example, the multiview display may include a GPU configured to function as the image processor 120. In yet other embodiments, aspects or portions of the image processor 120 may be distributed among the cameras 110 of the plurality and the multiview display.

According to various embodiments, an arrangement (i.e., a pattern) of the plurality of cameras 110 corresponds to and is dictated by an arrangement of views of the multiview display configured to display the cropped images 118. Referring again to FIG. 5A, for example, the square arrangement (or array) of cameras 110 illustrated on the left side of the figure correspond to a square arrangement of views 14 of the multiview display on the right side of FIG. 5A. A bold arrow in FIG. 5A depicts the correspondence between the square arrangement of views 14 and the square arrangement of cameras 110. Similarly, the rectangular camera arrangement on the left side of FIG. 5B corresponds to and is dictated by (bold arrow) a rectangular arrangements of views 14 depicted on the right side of FIG. 5B. The circular camera arrangement in FIG. 5C corresponds to and is dictated by (bold arrow) a circular arrangement of views 14 depicted on the right side of FIG. 5C; and the hexagonal camera arrangement in FIG. 5D corresponds to and is dictated by (bold arrow) a hexagonal arrangement of views 14 depicted on the right side of FIG. 5D, as illustrated therein.

In various embodiments, there is a one-to-one correspondence between the cameras 110 (and equivalently the cropped images 118) and the views 14 of the multiview display. For example, each of the arrangements in FIGS. 5A-5D illustrates a one-to-one correspondence. The one-to-one correspondence may substantially eliminate creation of synthesized views (e.g., using image interpolation) when transferring cropped images 118 for display on the corresponding views 14 of the multiview display, for example. In particular, by virtue of the one-to-one correspondence, once an image 112 is captured by a camera 110 of the plurality and subsequently cropped according to the cropping window 108', the cropped images 118 may be communicated directly to a corresponding view 14 substantially without additional image processing, according to some embodiments. Even if additional image processing may be employed (e.g., as described below), the image processing is generally much less computationally expensive than the image processing used to create novel (e.g., interpolated) images for a view by the multiview display.

According to some embodiments, a number of the cameras 110 of the plurality is equal to or substantially equal to a number of the views of the multiview display. Moreover, the number of the cameras 110 may equal or substantially equal the number of views in addition to a one-to-one correspondence of the camera arrangement and the view arrangement. For example, a square arrangement of views and a corresponding square arrangement of the cameras 110 may include a total of sixteen cameras 110 and views 14 arranged as a four by four (4×4) array. In other examples, the square arrangement of views 14 and the correspondingly arranged cameras 110 may include, but is not limited to, a five by five (5×5), an eight by eight (8×8), a thirty-two by thirty-two (32×32), or a sixty-four by sixty-four (64×64) array of both the views 14 and the cameras 110. In another example, the cameras 110 of the plurality may be arranged in a rectangular arrangement to correspond to the views 14 of the multiview display having a rectangular arrangement. The rectangular arrangement of the cameras 110 may correspond to a four by eight (4×8) rectangular arrangement of views 14, for example. In other examples, the rectangular arrangement may include, but is not limited to, an eight by sixteen (8×16), a sixteen by thirty-two (16×32), or a thirty-two by sixty-four (32×64) array of both the views 14 and the cameras 110. Note, while specific numbers of the views 14 and the cameras 110 are given above, substantially any number of the views 14 and the cameras 110 in a corresponding arrangement may be used in the multiview camera 100, according to various embodiments.

In other embodiments, a number of the cameras 110 of the plurality is greater, and may be substantially greater, than a number of the views of the multiview display. When the number of the cameras 110 is greater than the number of the views, a subset of the cameras 110 of the plurality may be selected and configured to capture the images used to provide the cropped images to be displayed by the multiview display. For example, different subsets of the cameras 110 may be selected at different time periods to scan a region of a scene being imaged. Scanning may be used to track an object moving through the scene, for example.

Figure 6:
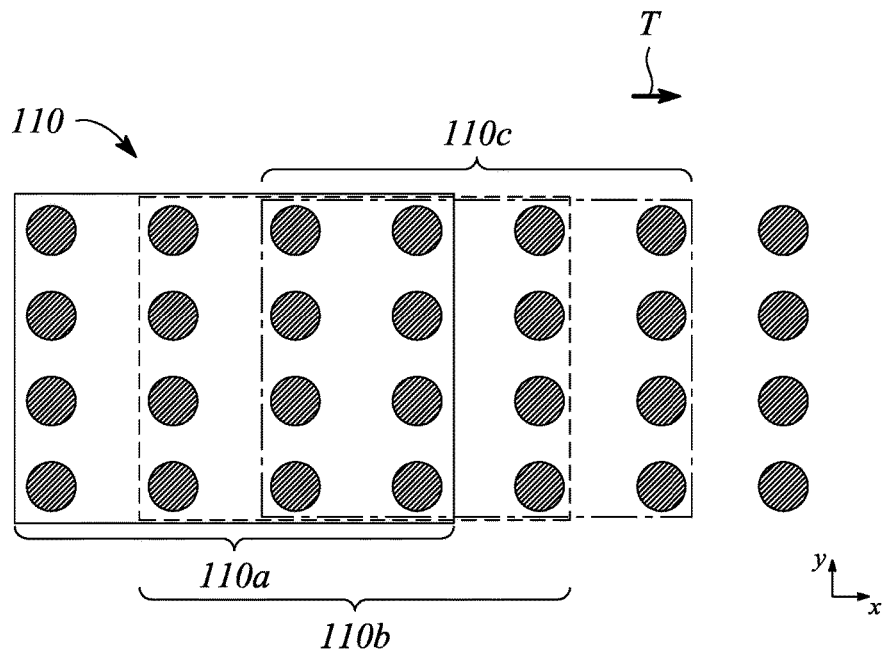
FIG. 6 illustrates a plan view of a rectangular array of cameras in an example, according to an embodiment consistent with the principles described herein.

FIG. 6 illustrates a plan view of a rectangular array of cameras 110 in an example, according to an embodiment consistent with the principles described herein. In particular, the rectangular array of cameras 110 illustrated in FIG. 6 includes a greater number of the cameras 110 than a corresponding number of views of the multiview display in this example. As illustrated in FIG. 6, subsets of the cameras 110 in the rectangular array may correspond to a square arrangement of views of the multiview display. Moreover, a number of the cameras 110 (e.g., sixteen arranged in a four by four array, as illustrated) in each of the subsets may have a one-to-one correspondence to a number of views (e.g., also arranged in a four by four array). In particular, a first subset 110a of the cameras 110 may correspond to the square view arrangement of the multiview display during a first time period $T_1$, a second subset 110b of the cameras 110 may correspond to the square view arrangement of the multiview display in a second time period $T_2$, and the third subset 110c of the cameras 110 may correspond to the square view arrangement of the multiview display during a third time period $T_3$. Switching between the camera subsets 110a, 110b, 110c during time periods $T_1$, $T_2$, $T_3$ that are sequential as indicated by a bold arrow T in FIG. 6, may be used to provide a scan of a scene using sequentially sets of captured images, according to various embodiments.

According to some embodiments, the multiview camera 100 comprises an adjustable baseline between the cameras 110 of the plurality. In particular, the adjustable baseline may be configured to adjust or change a distance between the cameras 110 in the arrangement. According to some embodiments, the adjustable baseline between a first pair of the cameras 110 may be independently adjustable relatively to the adjustable baseline between a second pair of the cameras 110. In other embodiments, the adjustable baseline is configured to provide uniform adjustment of the distance between the cameras 110. Uniform adjustment may be configured to provide depth compression (or depth expansion) of the multiview image displayed by the multiview display using the cropped images, according to various embodiments.

Figure 7:
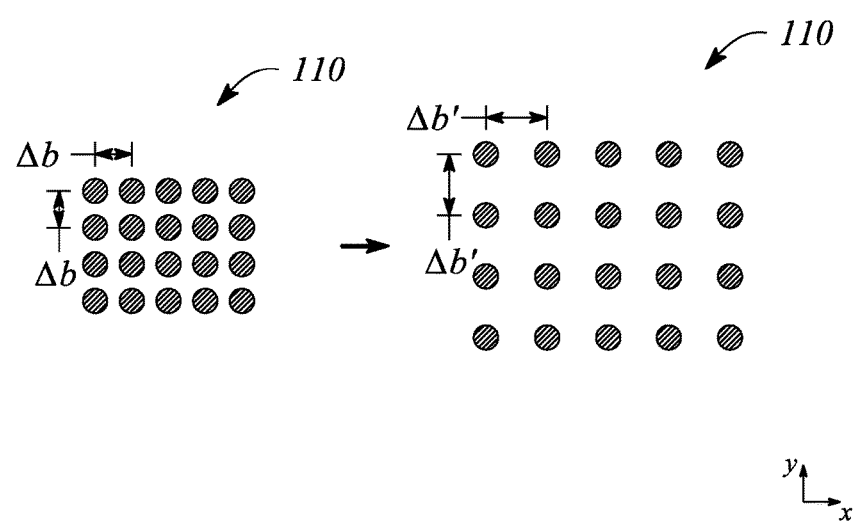
FIG. 7 illustrates a plan view of a plurality of cameras having an adjustable baseline in an example, according to an embodiment consistent with the principles described herein.

FIG. 7 illustrates a plan view of a plurality of cameras 110 having an adjustable baseline Δb in an example, according to an embodiment consistent with the principles described herein. In particular, the adjustable baseline Δb illustrated in FIG. 7 is configured to provide uniform adjustment of the distance between the cameras 110. As illustrated on a left side of FIG. 7 relative to a right side, the adjustable baseline is changed from Δb to Δb', as indicated by a bold arrow, where Δb≠Δb'. The adjustment results in the inter-camera spacing changing uniformly throughout the plurality of cameras 110. That is, the uniform adjustment simply scales the spacing between the cameras 110 in a uniform or consistent manner, as illustrated in FIG. 7, by way of example.

According to some embodiments, the image processor 120 illustrated in FIG. 2 is further configured to provide image rectification of a cropped image. For example, image rectification may be provided for all of the cropped images by the image processor 120. Herein, 'image rectification' is defined as a projection of two or more images onto a common image plane. Image rectification generally employs a linear transformation to convert a distorted version of a rectangular virtual screen having a quadrangular shape into a rectangle for display on the multiview display. The rectangular virtual screen may have a quadrangular shape as a result of an oblique angle of the image capture associated with the various cameras 110.

Figure 8:
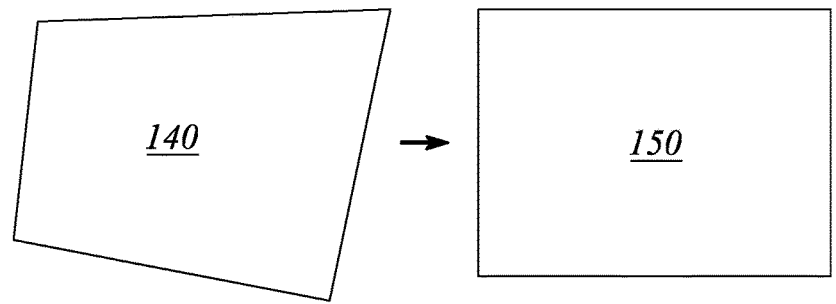
FIG. 8 illustrates a plan view of an example of image rectification, according to an embodiment consistent with the principles described herein.

FIG. 8 illustrates a plan view of an example of image rectification, according to an embodiment consistent with the principles described herein. In particular, a quadrangle 140 on a left side of FIG. 8 representing the distorted virtue screen is transformed into a rectangle 150 representing a cropped image following image rectification on a right side of FIG. 8. A bold arrow in FIG. 8 illustrates a direction of the image rectification by the image processor 120, according to various embodiments. The image rectification illustrated in FIG. 8 may be similar to image rectification described by Zhengyou Zhang, "Whiteboard Scanning and Image Enhancement," Technical Report MSR-TR-2003-39, June 2003, Microsoft Research, Microsoft Corporation, Redmond Wash., pp. 1-20, for example.

According to various embodiments, the multiview display may be substantially any multiview display. For example, the multiview display may comprise an autostereoscopic or multiview display based on, but not limited to, lenticular arrays, parallax barriers, Fourier-plane shuttering, retro-reflective mirrors or half-silvered mirrors. In some embodiments, the multiview display may be a multibeam backlight-based display. For example, the multiview display may be a multibeam diffraction grating-based display comprising a multibeam diffraction grating-based backlight, as described below.

According to various embodiments, the multibeam diffraction grating-based display is configured to provide a plurality of different views of a displayed image (i.e., the multiview image). Substantially any number of different views may be provided as the plurality of different views, according to various embodiments. For example, the plurality of different views of the displayed image may include three, four, five, six, seven, eight or more different views. In other examples, the plurality of different views (e.g., views of the displayed multiview image 104, described above) may include a relatively large number of different views up to and including, but not limited to, sixteen (16), thirty-two (32), sixty-four (64), one hundred twenty-eight (128), or two hundred fifty-six (256) different views. Further, the views may be arranged in any of number of different arrangements including, but not limited to, a square arrangement, a rectangular arrangement, a circular or radial arrangement or a hexagonal arrangement.

Figure 9A:
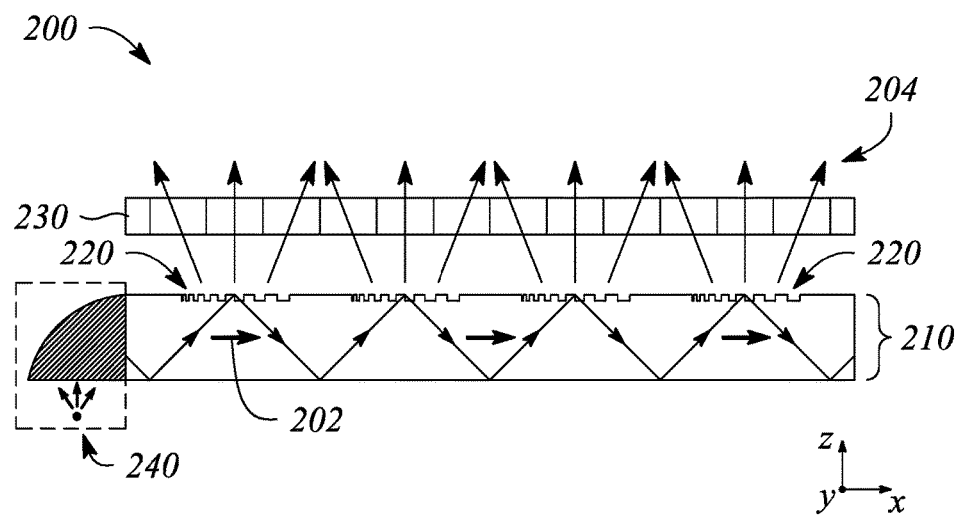
FIG. 9A illustrates a cross sectional view of a multibeam diffraction grating-based display in an example, according to an embodiment consistent with the principles described herein.
Figure 9B:
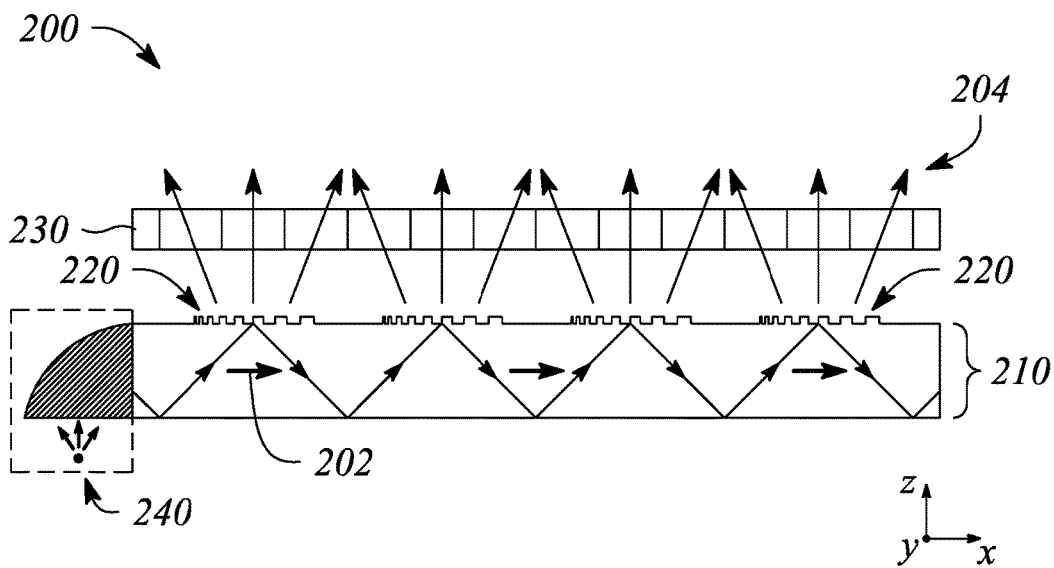
FIG. 9B illustrates a cross sectional view of a multibeam diffraction grating-based display in an example, according to another embodiment consistent with the principles described herein.

FIG. 9A illustrates a cross sectional view of a multibeam diffraction grating-based display 200 in an example, according to an embodiment consistent with the principles described herein. FIG. 9B illustrates a cross sectional view of a multibeam diffraction grating-based display 200 in an example, according to another embodiment consistent with the principles described herein. According to various embodiments, the multibeam diffraction grating-based display 200 illustrated in FIGS. 9A-9B is configured to produce 'directional' light, i.e., light comprising light beams or light rays having different principal angular directions. Light beams 204 having different principal angular directions are illustrated by arrows in FIG. 9A-9B.

For example, as illustrated in FIGS. 9A-9B, the multibeam diffraction grating-based display 200 is configured to provide or generate a plurality of light beams illustrated as arrows directed out and away from the multibeam diffraction grating-based display 200 in different predetermined principal angular directions (e.g., as a light field). In turn, the light beams of the plurality may be modulated, as described below, to facilitate the display of information, i.e., different views of an image (e.g., the displayed image). In some embodiments, the light beams having different predetermined principal angular directions form a plurality of views (e.g., 3D views) of a multiview image that is to be displayed by the multibeam diffraction grating-based display 200. Further, the multibeam diffraction grating-based display 200 may be a multiview display, according to various embodiments.

As illustrated in FIGS. 9A and 9B, the multibeam diffraction grating-based display 200 comprises a plate light guide 210. The plate light guide 210 is configured to guide light as a guided light beam (illustrated as an extended arrow propagating in the plate light guide 210, as further described below). For example, the plate light guide 210 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light according to one or more guided modes of the plate light guide 210, for example.

According to various embodiments, light is guided by and along a length of the plate light guide 210. Further, the plate light guide 210 is configured to guide the light, as a guided light beam, at a non-zero propagation angle. The guided light beam may be guided at the non-zero propagation angle within the plate light guide 210 using total internal reflection, for example. In particular, the guided light beam propagates by reflecting or 'bouncing' between a top surface and a bottom surface of the plate light guide 210 at the non-zero propagation angle (e.g., illustrated by the extended, angled arrow representing a light ray of the guided light beam).

As defined herein, the 'non-zero propagation angle' is an angle relative to a surface (e.g., the top surface or the bottom surface) of the plate light guide 210. Further, the non-zero propagation angle is both greater than zero and less than a critical angle of total internal reflection within the plate light guide 210, according to various embodiments. For example, the non-zero propagation angle of the guided light beam may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

The light guided as the guided light beam in the plate light guide 210 may be introduced or coupled into the plate light guide 210 at the non-zero propagation angle (e.g., about 30-35 degrees). One or more of a lens, a mirror or similar reflector (e.g., a tilted collimating reflector), and a prism (not illustrated) may facilitate coupling light into an input end of the plate light guide 210 as the beam of light at the non-zero propagation angle, for example. Once coupled into the plate light guide 210, the guided light beam propagates along the plate light guide 210 in a direction that is generally away from the input end (e.g., illustrated by bold arrows 202 pointing along an x-axis in FIGS. 9A-9B).

Further, the guided light beam produced by coupling light into the plate light guide 210 may be a collimated light beam, according to various embodiments. In particular, by 'collimated light beam' it is meant that rays of light within the guided light beam are substantially parallel to one another within the guided light beam. Rays of light that diverge or are scattered from the collimated light beam of the guided light beam are not considered to be part of the collimated light beam, by definition herein. Collimation of the light to produce the collimated guided light beam may be provided by a collimator including, but not limited to, the lens or mirror (e.g., tilted collimating reflector, etc.) described above that is used to couple the light into the plate light guide 210.

In some embodiments, the plate light guide 210 may be a slab or plate optical waveguide comprising an extended, substantially planar sheet of optically transparent, dielectric material. The substantially planar sheet of dielectric material is configured to guide the guided light beam using total internal reflection. According to various embodiments, the optically transparent material of the plate light guide 210 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some embodiments, the plate light guide 210 may further include a cladding layer (not illustrated) on at least a portion of a surface (e.g., one or both of the top surface and the bottom surface) of the plate light guide 210. The cladding layer may be used to further facilitate total internal reflection, according to some embodiments.

As illustrated in FIGS. 9A and 9B, the multibeam diffraction grating-based display 200 further comprises an array of multibeam diffraction gratings 220. The multibeam diffraction gratings 220 may be located at a surface of the plate light guide 210 (e.g., the top or 'front' surface), as illustrated therein. In other examples (not illustrated), one or more of the multibeam diffraction gratings 220 may be located within the plate light guide 210. In yet other examples (not illustrated), one or more of the multibeam diffraction gratings 220 may be located at or on the bottom or 'back' surface of the plate light guide 210 (i.e., an opposite surface to the surface illustrated with the multibeam diffraction gratings 220). In combination, the plate light guide 210 and the array of multibeam diffraction gratings 220 provide or serve as a multibeam grating-based backlight of the multibeam diffraction grating-based display 200.

According to various embodiments, a multibeam diffraction grating 220 of the array is configured to scatter or diffractively couple out a portion of the guided light beam as the plurality of light beams having the above-mentioned different predetermined principal angular directions corresponding to different views of the multibeam diffraction grating-based display 200 (i.e., the multiview display). For example, the portion of the guided light beam may be diffractively coupled out by the multibeam diffraction grating 220 through the plate light guide surface (e.g., through the top surface of the plate light guide 210). Further, the multibeam diffraction grating 220 is configured to diffractively couple out the portion of the guided light beam as coupled-out light beams and to diffractively redirect the coupled-out light beams away from the plate light guide surface. As described above, each of the coupled-out light beams of the plurality may have a different predetermined principal angular direction determined by characteristics of diffractive features of the multibeam diffraction grating 220

In particular, the multibeam diffraction gratings 220 of the array include a plurality of diffractive features that provide diffraction. The provided diffraction is responsible for the diffractive coupling of the portion of the guided light beam out of the plate light guide 210. For example, the multibeam diffraction grating 220 may include one or both of grooves in a surface of the plate light guide 210 and ridges protruding from the plate light guide surface that serve as the diffractive features. The grooves and the ridges may be arranged parallel to one another and, at least at some point along the diffractive features, the grooves and the ridges are perpendicular to a propagation direction of the guided light beam that is to be coupled out by the multibeam diffraction grating 220.

In some examples, the grooves or the ridges may be etched, milled or molded into the plate light guide surface. As such, a material of the multibeam diffraction gratings 220 may include the material of the plate light guide 210. As illustrated in FIG. 9A, for example, the multibeam diffraction gratings 220 include substantially parallel grooves that penetrate the surface of the plate light guide 210. In FIG. 9B, the multibeam diffraction gratings 220 include substantially parallel ridges that protrude from the surface of the plate light guide 210. In other examples (not illustrated), the multibeam diffraction gratings 220 may comprise a film or layer applied or affixed to the plate light guide surface.

According to some embodiments, the multibeam diffraction grating 220 may be or comprise a chirped diffraction grating. By definition, the 'chirped' diffraction grating is a diffraction grating exhibiting or having a diffraction spacing of the diffractive features (i.e., a diffraction pitch) that varies across an extent or length of the chirped diffraction grating, e.g., as illustrated in FIGS. 9A-9B. Herein, the varying diffraction spacing is defined and referred to as a 'chirp'. As a result of the chirp, the portion of the guided light beam that is diffractively coupled out of the plate light guide 210 exits or is emitted from the chirped diffraction grating as the coupled-out light beams at different diffraction angles corresponding to different points of origin across the chirped diffraction grating of the multibeam diffraction grating 220. By virtue of a predefined chirp, the chirped diffraction grating is responsible for the predetermined and different principal angular directions of the coupled-out light beams of the light beam plurality.

In some examples, the chirped diffraction grating of the multibeam diffraction grating 220 may have or exhibit a chirp of the diffractive spacing that varies linearly with distance. As such, the chirped diffraction grating is a 'linearly chirped' diffraction grating, by definition. FIGS. 9A-9B illustrate the multibeam diffraction grating 220 as a linearly chirped diffraction grating, by way of example and not limitation. In particular, as illustrated, the diffractive features are closer together at a first end of the multibeam diffraction grating 220 than at a second end. Further, the diffractive spacing of the illustrated diffractive features varies linearly from the first end to the second end, as illustrated.

In another example (not illustrated), the chirped diffraction grating of the multibeam diffraction grating 220 may exhibit a non-linear chirp of the diffractive spacing. Various non-linear chirps that may be used to realize the multibeam diffraction grating 220 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 9C:
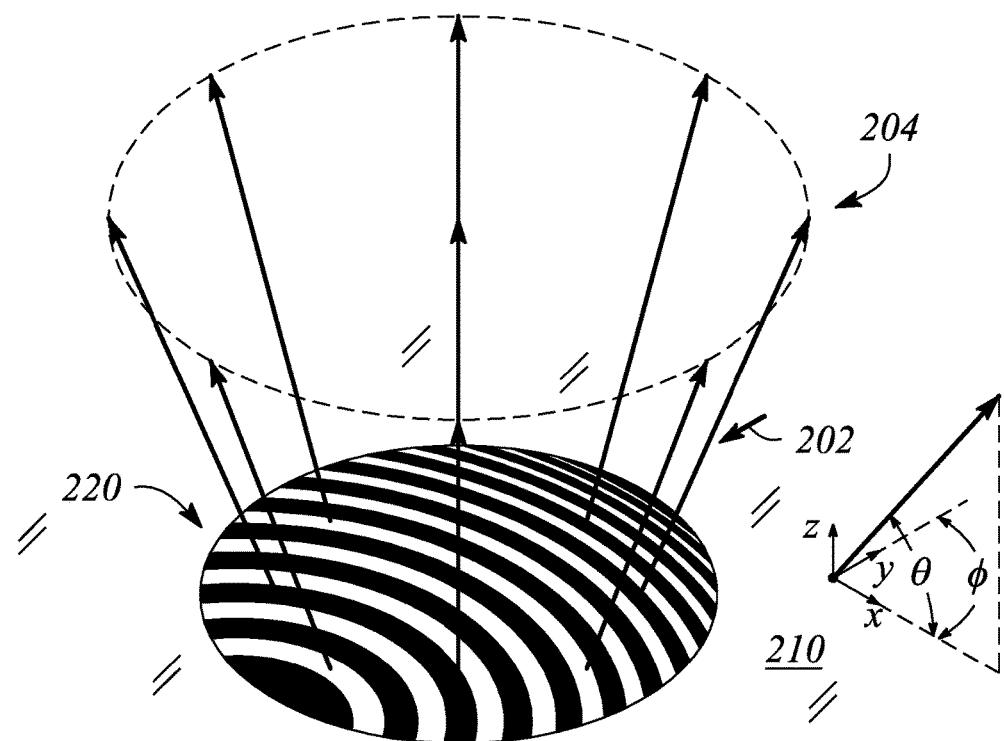
FIG. 9C illustrates a perspective view of a multibeam diffraction grating in an example, according to an embodiment consistent with the principle described herein.

According to some embodiments, the multibeam diffraction grating 220 may comprise diffractive features that are one or both of curved and chirped. FIG. 9C illustrates a perspective view of a multibeam diffraction grating 220 in an example, according to an embodiment consistent with the principle described herein. As illustrated in FIG. 9C, the multibeam diffraction grating 220 is in, at or on a surface of the plate light guide 210. Further, the illustrated multibeam diffraction grating 220 comprises diffractive features that are both curved and chirped (i.e., the multibeam diffraction grating 220 in FIG. 9C is a curved, chirped diffraction grating).

As illustrated in FIG. 9C, the guided light beam has an incident direction relative to the multibeam diffraction grating 220 illustrated as a bold arrow labeled 202 at a first end of the multibeam diffraction grating 220. Also illustrated is the plurality of coupled-out or emitted light beams 204 illustrated by arrows pointing away from the multibeam diffraction grating 220 at the surface of the plate light guide 210. The light beams 204 are emitted in a plurality of different predetermined principal angular directions. In particular, the predetermined different principal angular directions of the emitted light beams 204 are different from one another in both azimuth and elevation, as illustrated therein. According to various examples, both the predefined chirp of the diffractive features and the curve of the diffractive features may be responsible for the different predetermined principal angular directions of the emitted light beams 204.

At different points along the curve of the diffractive features, an 'underlying diffraction grating' of the multibeam diffraction grating 220 associated with the curved diffractive features has different azimuthal orientation angles. By 'underlying diffraction grating', it is meant a diffraction grating of a plurality of non-curved diffraction gratings that, in superposition, yields the curved diffractive features of the multibeam diffraction grating 220. At a given point along the curved diffractive features, the curve has a particular azimuthal orientation angle that generally differs from the azimuthal orientation angle at another point along the curved diffractive features. Further, the particular azimuthal orientation angle results in a corresponding azimuthal component of a principal angular direction of a light beam emitted from the given point. In some examples, the curve of the diffractive features (e.g., grooves, ridges, etc.) may represent a section of a circle. The circle may be coplanar with the light guide surface. In other examples, the curve may represent a section of an ellipse or another curved shape, e.g., that is coplanar with the light guide surface.

According to some embodiments, the multibeam diffraction grating-based display 200 further comprises an array of light valves or a light valve array 230. The light valve array 230 may be configured to selectively modulate the coupled-out light beams 204 as a plurality of pixels (i.e., modulated pixels) corresponding to pixels of the different views of the displayed multiview image. For example, referring to FIGS. 9A-9B, the light valve array 230 is illustrated adjacent to the plate light guide surface. According to various embodiments, the light valve array 230 is configured to modulate the differently directed light beams 204 (i.e., the plurality of light beams 204 having different predetermined principal angular directions from the multibeam diffraction gratings 220) corresponding to the different views of the displayed image. In particular, the light beams 204 of the light beam plurality pass through and are modulated by individual light valves of the light valve array 230. The modulated, differently directed light beams 204 may represent pixels of the different views of the displayed image depending on the different directions of the coupled-out light beams, according to various embodiments. In various embodiments, different types of light valves may be employed in the light valve array 230 including, but not limited to, one or more of liquid crystal light valves, electrophoretic light valves, and light valves based on electrowetting.

According to some embodiments (e.g., as illustrated in FIGS. 9A-9B), the multibeam diffraction grating-based display 200 may further comprise a light source 240. The light source 240 is configured to provide the collimated light beam to the plate light guide 210. In particular, the light source 240 may be located adjacent to an entrance surface or end (input end) of the plate light guide 210. In various embodiments, the light source 240 may comprise substantially any source of light (e.g., optical emitter) including, but not limited to, one or more light emitting diodes (LEDs) or a laser (e.g., laser diode). In some embodiments, the light source 240 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In some embodiments, the light source 240 may comprise a plurality of different optical emitters configured to provide different colors of light. The different optical emitters may be configured to provide light having different, color-specific, non-zero propagation angles of collimated light beams corresponding to each of the different colors of light.

In some embodiments, the light source 240 may further comprise a collimator (illustrated as a shaded region in FIGS. 9A-9B). The collimator may be configured to receive substantially uncollimated light from one or more of the optical emitters of the light source 240. The collimator is further configured to convert the substantially uncollimated light into a collimated light beam. In particular, the collimator may provide a collimated light beam that is collimated in two substantially orthogonal directions, according to some embodiments. Moreover, when optical emitters of different colors are employed, the collimator may be configured to provide the collimated light beams having the different, color-specific, non-zero propagation angles. The collimator is further configured to communicate the collimated light beam to the plate light guide 210 to propagate as the collimated guided light beam having the non-zero propagation angle, described above.

Figure 10:
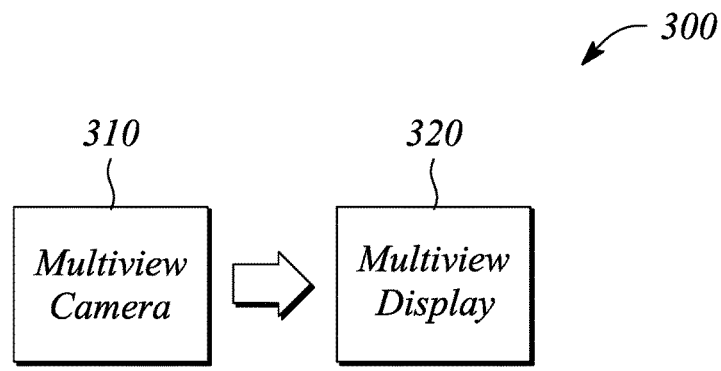
FIG. 10 illustrates a block diagram of a multiview imaging system in an example, according to an embodiment consistent with the principles described herein.

In accordance with some embodiments of the principles described herein, a multiview imaging system or a multiview image capture and display system is provided. FIG. 10 illustrates a block diagram of a multiview imaging system 300 in an example, according to an embodiment consistent with the principles described herein. According to various embodiments, the multiview imaging system 300 may provide capture and display of multiview images according to a plurality of different views corresponding to different view directions. In some embodiments, the different views of the multiview images may be perceived as three-dimensional (3D) images. Further, the capture and display may be accomplished with reduced image processing compared to other 3D displays, and according to some embodiments with minimal image processing. In turn, either reduced image processing or minimal image processing may facilitate capture, transmission and display of multiview images in real-time or near real-time, for example.

As illustrated in FIG. 10, the multiview imaging system 300 comprises a multiview camera 310, which may be referred to as a 'Holocam'. The multiview camera 310 comprises an array of cameras configured to capture a plurality of images of a scene. According to various embodiments, the captured images have a portion of the scene that is in common with one another corresponding to an overlapping field-of-view (FOV) of the cameras. Further, each camera of the array is configured to capture a different image oft the plurality of images from a different perspective (i.e., different perspective view angle) of the scene, according to various embodiments. As illustrated in FIG. 10, the multiview imaging system 300 further comprises a multiview display 320. The multiview display 320 is configured to display cropped images represented by in-common portions of the captured images as different views of the multiview display 320 to provide a multiview image of the scene or the captured images from the scene. According to various embodiments, an arrangement of the cameras in the array of the multiview camera 310 corresponds to an arrangement of the views of the multiview display 320. Moreover, the cameras and the views have a one-to-one correspondence, according to various embodiments. As such, the array of cameras of the multiview camera 310 has more than two (i.e., three or more) cameras, according to various embodiments. According to some embodiments, a number of cameras in the array may be greater than a number of views of the multiview display. In these embodiments, a subset of the cameras in the array have a one-to-one correspondence to the views of the multiview display 320.

In some embodiments, the multiview camera 310 may be substantially similar to the plurality of cameras 110 of the multiview camera 100, described above. In particular, the array of cameras of the multiview camera 310 may be arranged on a surface or by a structure or support. For example, the corresponding arrangement of the cameras of the array and of the views of the multiview display 320 may include, but is not limited to, a square arrangement, a rectangular arrangement, circular arrangement or a hexagonal arrangement. Further, the surface or structure may be or provide planar surface or a curved surface of the arranged cameras, for example. Further, in some embodiments, the array of cameras may be configured to provide an adjustable baseline between the cameras of the array, the adjustable baseline being configured to adjust a distance between the cameras.

In some embodiments, the multiview display 320 may be substantially similar to the multiview display described above with respect to the multiview camera 100. In particular, the multiview display 320 may be substantially any display configured to provide a plurality of different views (i.e., greater than two) corresponding to different view directions. In some embodiments, the multiview display 320 may be substantially similar to the multibeam diffraction grating-based display 200, described above.

In particular, according to some embodiments, the multiview display 320 may comprise a plate light guide configured to guide a collimated light beam at a non-zero propagation angle. The multiview display 320 may further comprise a multibeam diffraction grating array configured to diffractively couple out a portion of the guided collimated light beam as a plurality of coupled-out light beams having predetermined principal angular directions corresponding to different view directions of the different views of the multiview display, according to some embodiments. In some embodiments, each of the plate light guide and the multibeam diffraction grating array (or multibeam diffraction gratings thereof) may be substantially similar respectively to the plate light guide 210 and the multibeam diffraction grating 220 of the multibeam diffraction grating-based display 200, described above. For example, a multibeam diffraction grating of the multibeam diffraction grating array may comprise a chirped diffraction grating having curved diffractive features. Further, a multibeam diffraction grating of the multibeam diffraction grating array is located adjacent to a surface of the plate light guide.

According to some embodiments, the multiview display 320 may further comprise a light source configured to provide the collimated light beam. The light source may be substantially similar to the light source 240 of the multibeam diffraction grating-based display 200, for example. Further, the multiview display 320 may further comprise a light valve array configured to selectively modulate the coupled-out light beams of the plurality as pixels (e.g., multiview or 3D pixels) corresponding to the different views of the multiview display 320. The light valve array may be substantially similar to the light valve array 230, described above with respect to the multibeam diffraction grating-based display 200, according to some embodiments.

In some embodiments (not illustrated in FIG. 10), the multiview imaging system 300 may further comprise an image processor. The image processor may be configured to provide cropping and image rectification of the captured images within respective in-common portions of the FOV according to a cropping window. Further, the cropping window may correspond to a virtual screen representing a screen of the multiview display. Also, the virtual screen may be located within the scene at a depth corresponding to a zero disparity plane of the multiview display 320, according to various embodiments. In some embodiments, the image processor of the multiview imaging system 300 may be substantially similar to the image processor 120 described above with respect to the multiview camera 100.

Figure 11:
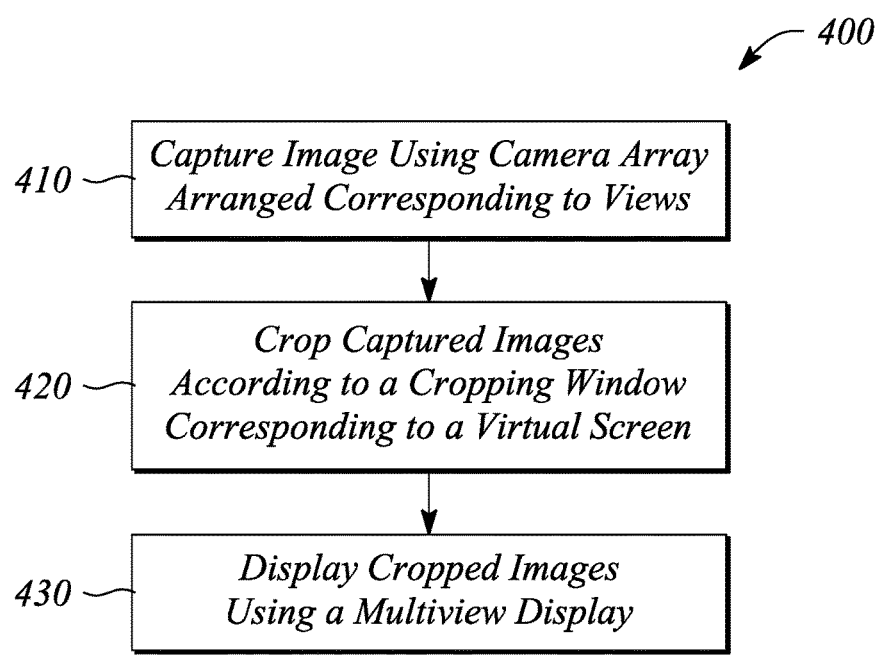
FIG. 11 illustrates a flow chart of a method of multiview image capture in an example, according to an embodiment consistent with the principles described herein.

In accordance with other embodiments of the principles described herein, a method of multiview image capture is provided. FIG. 11 illustrates a flow chart of a method 400 of multiview image capture in an example, according to an embodiment consistent with the principles described herein. As illustrated in FIG. 11, the method 400 of multiview image capture comprises capturing 410 a plurality of images of a scene using an array of cameras. According to various embodiments, a camera of the array captures an image of the scene different from the images captured by other cameras of the array. Further, the captured images have an overlapping portion in common with one another, according to various embodiments.

As further illustrated in FIG. 11, the method 400 of multiview image capture further comprises cropping 420 the captured images according to a cropping window within the overlapping portion of the captured images using an image processor. According to various embodiments, the cropping window corresponds to a virtual screen located within the scene. Further, according to various embodiments, the array of cameras is arranged in an arrangement corresponding to an arrangement of views of a multiview display. The multiview display is configured to display the cropped captured images in the views.

In some embodiments, the array of cameras employed in capturing 410 a plurality of images is substantially similar to the plurality of cameras 110 described above with respect to the multiview camera 100. In some embodiments, the image processor used in cropping 420 each captured image is substantially similar to the image processor 120 of the multiview camera 100, described above. In some embodiments (not illustrated), the method 400 of multiview image capture further comprises performing image rectification of the cropped captured images. Image rectification may be performed after cropping 420, for example. The image processor may be employed to perform image rectification, according to some embodiments.

In some embodiments (e.g., as illustrated in FIG. 11), the method 400 of multiview image capture further comprises displaying 430 the cropped captured images with the multiview display. When displayed 430, each cropped captured image may be displayed in a different view of the multiview display to provide a multiview image of the scene corresponding to the virtual screen. According to various embodiments, the multiview display may be substantially any multiview display. In some embodiments, however, the multiview display comprises a multibeam diffraction grating-based display. For example, the multibeam diffraction grating-based display used in displaying 430 the cropped captured images may be substantially similar to the multibeam diffraction grating-based display 200, described above.

According to some embodiments (not illustrated), the method 400 of multiview image capture may further comprise adjusting a baseline between cameras of the array to provide depth compression of a representation of the scene displayed 430 as the views by the multiview display using the cropped captured images. Adjusting a baseline between cameras of the array may employ the adjustable baseline described above with respect to the multiview camera 100, for example.

Thus, there have been described examples and embodiments of a multiview camera, a multiview imaging system and a method of multiview image capture that employ a plurality of cameras in an arrangement that corresponds to an arrangement of views of a multiview display. It should be understood that the above-described examples and embodiments are merely illustrative of some of the many specific examples that represent the principles described herein. Clearly, those skilled in the art can readily devise numerous other arrangements without departing from the scope as defined by the following claims.

What is claimed is:

1. A multiview camera comprising:
    a plurality of cameras arranged on a surface, a camera of the plurality being configured to capture an image of a scene that is different from images of the scene captured by other cameras of the plurality, the captured image comprising an overlapping portion of the scene in common with captured images from other cameras of the plurality; and
    an image processor configured to provide cropped images from the captured images according to a cropping window defined within the overlapping scene portion, the cropping window corresponding to a virtual screen located within the scene,
    wherein an arrangement of the plurality of cameras corresponds to an arrangement of views of a multiview display configured to display the cropped images.

2. The multiview camera of claim 1, wherein the surface upon which the cameras are arranged comprises a planar surface.

3. The multiview camera of claim 1, wherein the corresponding arrangements of the plurality of cameras and of the multiview display views is a rectangular arrangement.

4. The multiview camera of claim 1, further comprising an adjustable baseline between the cameras of the plurality, the adjustable baseline being configured to adjust a distance between the cameras.

5. The multiview camera of claim 4, wherein the adjustable baseline is configured to provide a uniform adjustment of the distance between the cameras, the uniform adjustment being configured to provide depth compression of a multiview image displayed by the multiview display using the cropped images.

6. The multiview camera of claim 1, wherein the image processor is further configured to provide image rectification of the cropped images.

7. The multiview camera of claim 1, wherein a number of the cameras in the plurality is greater than a number of the views of the multiview display.

8. A multiview image capture and display system comprising the multiview camera of claim 1, the system further comprising the multiview display.

9. The multiview capture and display system of claim 8, wherein the multiview display comprises a plate light guide configured to guide a collimated light beam and a multibeam diffraction grating array configured to diffractively couple out a portion of the guided collimated light beam from the plate light guide as a plurality of coupled-out light beams having different principal angular directions corresponding to different views that are the views of the multiview display.

10. A multiview imaging system comprising:
    a multiview camera comprising an array of cameras configured to capture a plurality of images of a scene, captured images of the image plurality having a portion in common with one another corresponding to an overlapping field-of-view of the cameras, each camera being configured to capture a different image of the plurality of images from a different perspective of the scene; and
    a multiview display configured to display cropped images of the in-common portions of the captured images as different views of the multiview display as a multiview image of the scene,
    wherein an arrangement of the cameras in the array corresponds to an arrangement of the views of the multiview display, the cameras and the views having a one-to-one correspondence.

11. The multiview imaging system of claim 10, wherein the corresponding arrangement of the cameras of the array and of the views of the multiview display is a rectangular pattern on a curved surface.

12. The multiview imaging system of claim 10, wherein the array of cameras is configured to provide an adjustable baseline between the cameras, the adjustable baseline being configured to adjust a distance between the cameras.

13. The multiview imaging system of claim 10, wherein the multiview display comprises:
    a plate light guide configured to guide a collimated light beam at a non-zero propagation angle; and
    a multibeam diffraction grating array configured to diffractively couple out a portion of the guided collimated light beam as a plurality of coupled-out light beams having principal angular directions corresponding to different view directions of the different views of the multiview display.

14. The multiview imaging system of claim 13, wherein a multibeam diffraction grating of the multibeam diffraction grating array comprises a chirped diffraction grating having curved diffractive features.

15. The multiview imaging system of claim 13, wherein the multiview display further comprises:
- a light source configured to provide the collimated light beam; and
- a light valve array configured to selectively modulate coupled-out light beams of the plurality of coupled-out light beams as pixels corresponding to the different views of the multiview display,
- wherein a multibeam diffraction grating of the multibeam diffraction grating array is located adjacent to a surface of the plate light guide.

16. The multiview imaging system of claim 10, further comprising an image processor configured to provide cropping and image rectification of the captured images within respective in-common portions according to a cropping window, the cropping window corresponding to a virtual screen representing a screen of the multiview display, wherein the virtual screen is located within the scene at a depth corresponding to a zero disparity plane of the multiview display, and wherein the cropped and image-rectified captured images are the cropped images.

17. A method of multiview image capture, the method comprising:
- capturing a plurality of images of a scene using an array of cameras, a camera of the array capturing an image of the scene different from images captured by other cameras of the array, captured images of the image plurality having an overlapping portion in common with one another; and
- cropping the captured images according to a cropping window within the overlapping portion of the captured images using an image processor, the cropping window corresponding to a virtual screen located within the scene,
- wherein the array of cameras is arranged on a surface in an arrangement corresponding to an arrangement of views of a multiview display configured to display the cropped captured images using the views.

18. The method of multiview image capture of claim 17, further comprising performing image rectification of the cropped captured images.

19. The method of multiview image capture of claim 17, further comprising displaying the cropped captured images on the multiview display, each cropped capture image being displayed in a different view of the multiview display to provide a multiview image of the scene corresponding to the virtual screen.

20. The method of multiview image capture of claim 19, wherein the multiview display comprises a multibeam diffraction grating-based display.

21. The method of multiview image capture of claim 17, further comprising adjusting a baseline between cameras of the array to provide depth compression of a representation of the scene displayed as the views by the multiview display using the cropped captured images.

22. The method of multiview image capture of claim 17, wherein a number of the cameras in the array is greater than a number of the views of the multiview display.

* * * * *